(12) United States Patent
Meguro et al.

(10) Patent No.: US 8,345,122 B2
(45) Date of Patent: Jan. 1, 2013

(54) IMAGE PLAYBACK METHOD, MUSIC PROCESSING METHOD, IMAGE PLAYBACK APPARATUS, AND COMPUTER PROGRAM PRODUCT

(75) Inventors: Akihiko Meguro, Kawasaki (JP); Keiichi Hirose, Tokyo (JP); Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 1722 days.

(21) Appl. No.: 11/706,372

(22) Filed: Feb. 15, 2007

(65) Prior Publication Data

US 2007/0201837 A1 Aug. 30, 2007

(30) Foreign Application Priority Data

Feb. 20, 2006 (JP) .................................. 2006-042609

(51) Int. Cl.
*H04N 1/21* (2006.01)

(52) U.S. Cl. ........................ 348/230.1; 348/317; 348/552

(58) Field of Classification Search ............... 348/230.1, 348/317, 552
See application file for complete search history.

(56) References Cited

U.S. PATENT DOCUMENTS

| | | | |
|---|---|---|---|
| 5,898,119 A | 4/1999 | Tseng et al. | |
| 6,510,360 B1 * | 1/2003 | Kaymer et al. | 700/138 |
| 6,529,236 B1 * | 3/2003 | Watanabe | 348/230.1 |
| 6,831,624 B1 * | 12/2004 | Harrold | 345/98 |
| 7,271,932 B2 * | 9/2007 | Izumi | 358/1.9 |
| 7,408,587 B2 * | 8/2008 | Matsutani et al. | 348/441 |
| 2002/0191104 A1 * | 12/2002 | Matsutani et al. | 348/441 |
| 2003/0095785 A1 * | 5/2003 | Izumi | 386/46 |
| 2003/0110320 A1 | 6/2003 | Ono et al. | |
| 2005/0217462 A1 | 10/2005 | Thomson et al. | |
| 2006/0007353 A1 * | 1/2006 | Matsutani et al. | 348/441 |
| 2006/0139379 A1 | 6/2006 | Toma et al. | |

FOREIGN PATENT DOCUMENTS

| | | |
|---|---|---|
| CN | 1426060 A | 6/2003 |
| EP | 1 241 673 A2 | 9/2002 |
| EP | 1 431 887 A2 | 6/2004 |
| EP | 1 431 977 A2 | 6/2004 |
| EP | 1 492 342 A1 | 12/2004 |
| EP | 1 507 383 A2 | 2/2005 |
| JP | A 2001-103415 | 4/2001 |
| JP | A-2002-185908 | 6/2002 |
| JP | A 2003-234993 | 8/2003 |
| JP | 2005-049834 | 2/2005 |
| JP | 2005-333612 | 12/2005 |
| JP | 2007-096630 | 4/2007 |

OTHER PUBLICATIONS

"Now TV Has a Memory", Science and Mechanics, XP-002544523, http://blog.modernmechanix.com/mags/qf/c/ScienceAndMechanics/6-1960/med_tv_memory.jpg Jun. 1, 1960.
Japanese Office Action issued in Application No. 2006-042609; Dated Nov. 16, 2010 (With Translation).

(Continued)

*Primary Examiner* — Khanh Dinh
(74) *Attorney, Agent, or Firm* — Oliff & Berridge, PLC

(57) ABSTRACT

An image playback method that performs a sequential display of a plurality of image data including a moving image stored in a memory unit while each being switched at predetermined time intervals, includes converting a format of moving image data for the sequential display into a predetermined format for the sequential display prior to the sequential display.

22 Claims, 8 Drawing Sheets

OTHER PUBLICATIONS

Japanese Office Action issued in Application No. 2006-042609; Dated Feb. 22, 2011 (With Translation).

Shamma et al., "MusicStory: a Personalized Music Video Creator," Proceedings of the ACM International Conference on Multimedia, 2005, XP007908441.

"Ulead MediaStudio Pro 8," Ulead Systems, Inc., 2005, XP002554703.

European Search Report issued in European Patent Application No. 07102666.0 on Nov. 24, 2009.

Jul. 18, 2011 Office Action issued in European Patent Application No. 07 102 666.0.

Japanese Office Action issued in Application No. 2006-042609; Dated Nov. 11, 2010 (With Translation).

"Refurbished—Cyber-shot DSC-T9 Digital Camera DSC-T9", www.sony.com, obtained Apr. 26, 2007.

"Sony Cyber-Shot, Digital Still Camera User's Guide/Troubleshooting," 2005 Sony Corporation, pp. 40-42, 85 and 86.

"Powershot S80 Digital Camera, Power Shot S80," http://web.canon.jp/Imaging/pss80/index-e.html, obtained Apr. 26, 2007.

Aug. 4, 2010 Office Action issued in Chinese Patent Application No. 200710005826.7 (with English translation).

Oct. 9, 2009 Office Action issued in Chinese Patent Application No. 2007100058267 (with English translation).

Oct. 17, 2011 Office Action issued in Chinese Patent Application No. 200710005826.7 (with English translation).

Jun. 18, 2012 Office Action issued in Chinese Application No. 200710005826.7 w/translation.

Aug. 21, 2012 Office Action issued in Japanese Patent Application No. 2011-006842 w/translation.

* cited by examiner

IMAGE PLAYBACK METHOD, MUSIC PROCESSING METHOD, IMAGE PLAYBACK APPARATUS, AND COMPUTER PROGRAM PRODUCT

INCORPORATION BY REFERENCE

The disclosure of the following priority application is incorporated herein by reference:

Japanese Patent Application No. 2006-042609 filed Feb. 20, 2006.

BACKGROUND OF THE INVENTION

1. Field of the Invention

The present invention relates to an image playback method that sequentially displays image data while being switched at predetermined time intervals, a music processing method, an image playback apparatus, and a computer program product.

2. Description of the Related Art

The aforementioned sequential display is generally called as the slide show. Japanese Laid-Open Patent Publication No. 2001-103415 discloses an apparatus capable of performing the slide show.

SUMMARY OF THE INVENTION

Generally, the viewer of the slide show may be dissatisfied unless the images for the slide show are smoothly switched while maintaining the displayed image quality. The expensive playback apparatus equipped with the high-end CPU may satisfy the aforementioned requirement. However, it is difficult for the lower-cost model to satisfy the requirement. In case of the slide show which allows the moving image display selectively, the smooth display cannot be realized owing to the increase in the CPU load.

According to the 1st aspect of the present invention, an image playback method that performs a sequential display of a plurality of image data including a moving image stored in a memory unit while each being switched at predetermined time intervals, comprises: converting a format of moving image data for the sequential display into a predetermined format for the sequential display prior to the sequential display.

According to the 2nd aspect of the present invention, an image playback method that performs a sequential display of a plurality of image data stored in a memory unit while each being switched at predetermined time intervals, comprises: inputting a number n of images of the image data for the sequential display and a selection condition; and extracting the n image data as a maximum value that satisfy the input selection condition as the image data used for the sequential display.

According to the 3rd aspect of the present invention, an image playback method that performs a sequential display of a plurality of image data stored in a memory unit while each being switched at predetermined time intervals, comprises: playing back music during the sequential display; and selecting the music, and upon selection of the music, the music is made audible for audition and is played back with lower sound quality than the music to be played back in an actual sequential display.

According to the 4th aspect of the present invention, an image playback method that performs a sequential display of a plurality of image data stored in a memory unit while each being switched at predetermined time intervals, comprises: selecting a display effect for the sequential display, and upon selection of the display effect, the display effect is allowed to be previewed on the display more simpler than an actually performed sequential display.

According to the 5th aspect of the present invention, an image playback method that performs a sequential display of a plurality of image data stored in a memory unit while each being switched at predetermined time intervals, comprises: using a reduced image for the sequential display with its size smaller than that of an original image file stored in the memory unit, as the image file for the sequential display.

According to the 6th aspect of the present invention, in the image playback method according to the 5th aspect, it is preferred that a read only property is added to the original image file corresponding to the reduced image file for the sequential display.

According to the 7th aspect of the present invention, a music processing method for an image playback apparatus which performs a sequential display of a plurality of image data stored in a memory unit while each being switched at predetermined time intervals, comprises: processing a music file into a format suitable for a playback performed by the image playback apparatus; and transferring the processed music file to the image playback apparatus.

According to the 8th aspect of the present invention, a music processing method for an image playback apparatus that performs a sequential display of a plurality of image data stored in a memory unit while each being switched at predetermined time intervals, comprises: producing an analysis file that defines a display mode for the sequential display of the music file; and transferring the music file and the analysis file to the image playback apparatus.

According to the 9th aspect of the present invention, an image playback apparatus comprises: a control unit that execute an image playback method according to any one of the 1st through 6th aspects.

According to the 10th aspect of the present invention, a computer-readable computer program product comprises: an image playback program that allows a computer to execute an image playback method according to any one of the 1st through 6th aspects.

According to the 11th aspect of the present invention, a computer-readable computer program product comprises: a music processing program that allows a computer to execute a music processing method according to the 7th or 8th aspect.

DESCRIPTION OF THE PREFERRED EMBODIMENT

An embodiment of the present invention will be described referring to FIGS. 1 to 8.

Figure 1:
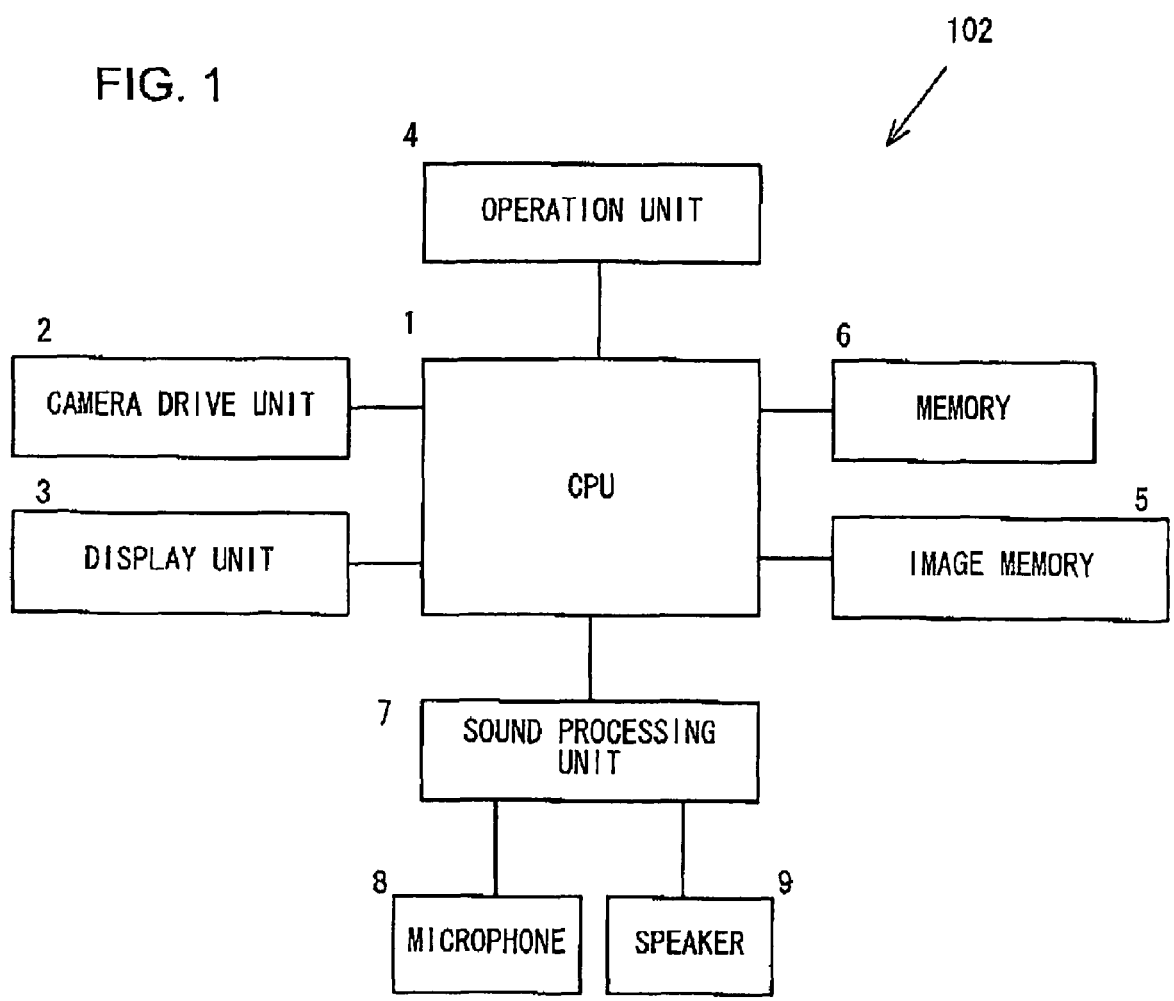
FIG. 1 is a block diagram of a digital camera according to an embodiment of the present invention.

FIG. 1 is a block diagram of a digital camera 102 according to the embodiment. A CPU 1 for fully controlling the camera is connected to a camera drive unit 2, a display unit 3, an operation unit 4, an image memory 5 and a memory 6. The camera drive unit 2 includes an image sensor, an image-capturing circuit, an image processing circuit, an image recording circuit, a lens drive circuit and the like for realizing operations of the digital camera. The camera 102 is capable of shooting moving images (moving pictures) as well as the still images. The display unit 3 formed of an LCD monitor and a drive circuit thereof to display the images and the menu screen. The slide show (described later) is also displayed on the display unit 3. The operation unit 4 includes various operation members and switches associated therewith for operations of the menu or those relevant to the image playback (reproduction) in addition to the operation member for shooting, for example, the release button, zoom button and the like. The CPU 1 is a computer (a control unit) provided in the camera 102 and executes various programs stored in the memory 6 as explained hereinafter.

The image memory 5 formed as a high-capacity memory which stores the image file produced by image-capturing includes a built-in memory fixed within the camera 102, and a recording medium such as a memory card which is detachably provided in the camera 102. In the embodiment, in addition to the image file, the music file for the slide show, and other files relevant to the slide show are recorded in the image memory 5.

An audio processing unit 7 records sound through a microphone 8 and plays back the recorded sound file or the music file through a speaker 9.

The slide show performed by the camera 102 will be described hereinafter.

The slide show is performed by sequentially displaying a plurality of images recorded in the image memory 5 one by one while being switched at predetermined time intervals. In the embodiment, the slide show may be performed while playing back the music as the BGM. The apparatus allows incorporation of both the still image and the moving image as the image to be displayed. In other words, the camera 102 can play back or reproduce the still image and the moving image as the slide show. The moving image may be referred to as the movie or the moving picture. The following settings are required before performing the slide show.

Figure 2:
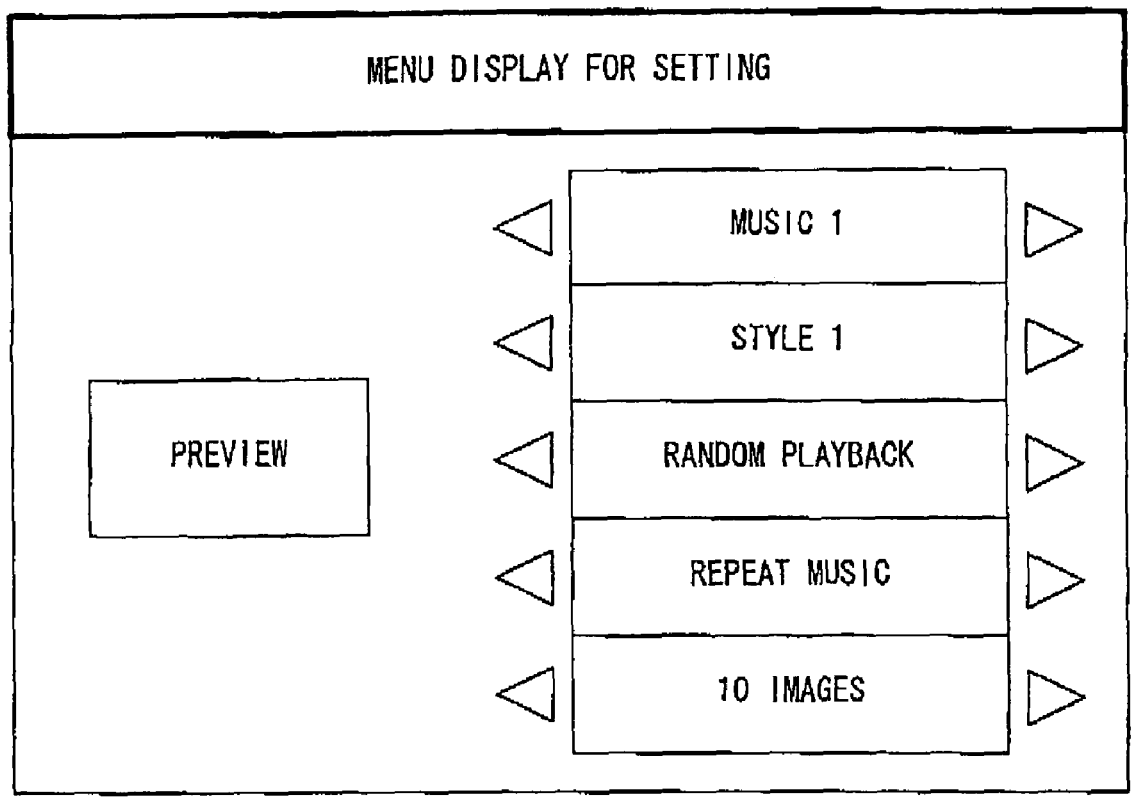
FIG. 2 is an exemplary menu display for setting the slide show.

The menu display for setting the slide show in FIG. 2 shows five items for selecting music, style, playback order, priority of music/image, and displayed image respectively, arranged from the top. The user selects an item to be set by a predetermined operation, for example, moving a cursor.

(1) Selection of Music

The music selection will be described referring to FIG. 3. The CPU 1 of the camera 102 executes a predetermined program stored in the memory 6 to perform the processing of FIG. 3. The top item of the menu shown in FIG. 2, that is, "music" is selected for the music selection. The "music 1" on the menu shown in FIG. 2 represents that one of a plurality of selectable music tunes has been selected (actually, the title of the selected music is displayed). By operating a right button of the four-way button, the music tune is switched to music 1, music 2, and the like. By operating a left button of the four-way button, the music tune is switched in reverse order. In the embodiment, several music files are preliminarily set in the built-in memory so as to be selected. Meanwhile, the user is allowed to download the favorite music via the personal computer (hereinafter referred to as PC) to be added for the slide show.

Figure 8:
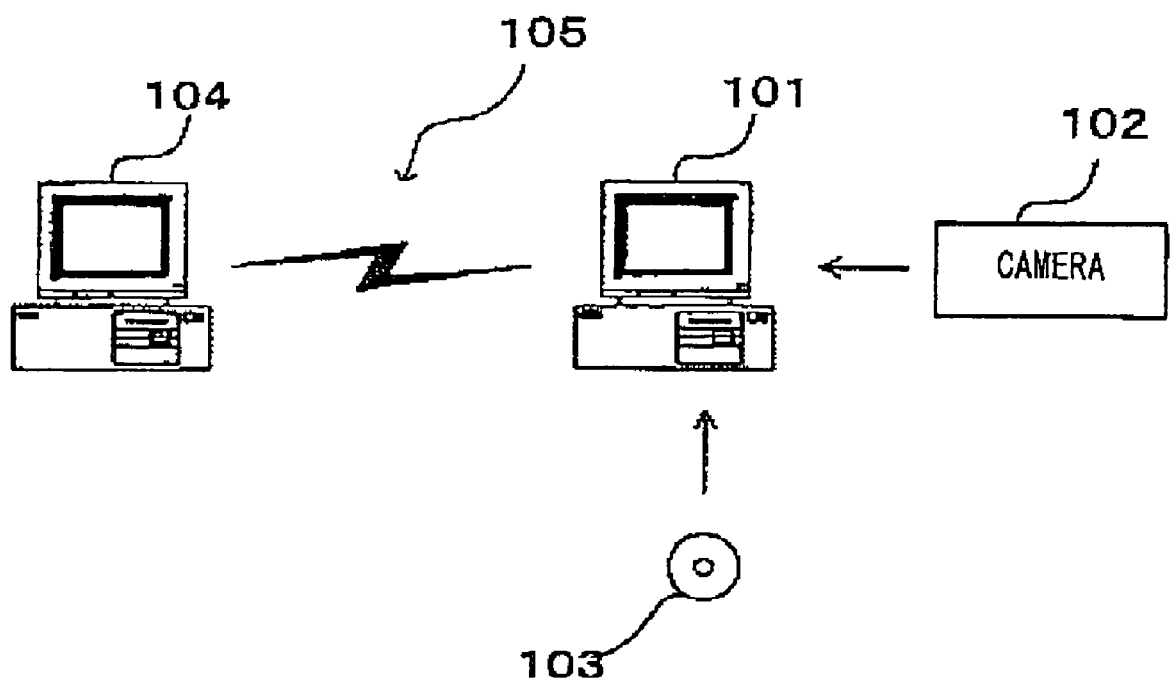
FIG. 8 is an explanatory view showing wired or wireless connection between the PC and the camera.

FIG. 8 is an explanatory view showing the wired or wireless connection between a PC 101 and the camera 102. The camera 102 downloads the music for the slide show by allowing the PC 101 to execute the program (described later) The program executed by the PC 101 is obtained by the recording medium 103, for example, the CD-ROM and DVD-ROM, or the other computer 104 to be connected via the Internet or the other communication line 105 so as to be installed in the PC 101. The PC 101 is formed of CPU (not shown), peripheral circuits (not shown) and a storage unit such as the hard disk. The CPU executes the installed program.

In the case where the program is downloaded via the Internet or the other communication line 105, the computer 104 reads the program from the hard disk (not shown) and transmits the program to the PC 101 via the communication line 105. In other words, the program is embodied as the data signal on the carrier wave to be transmitted to the PC 101 via the communication line 105. The program is supplied as the computer program product readable by the computer in the form of the recording medium and the carrier wave, for example.

Figure 4:
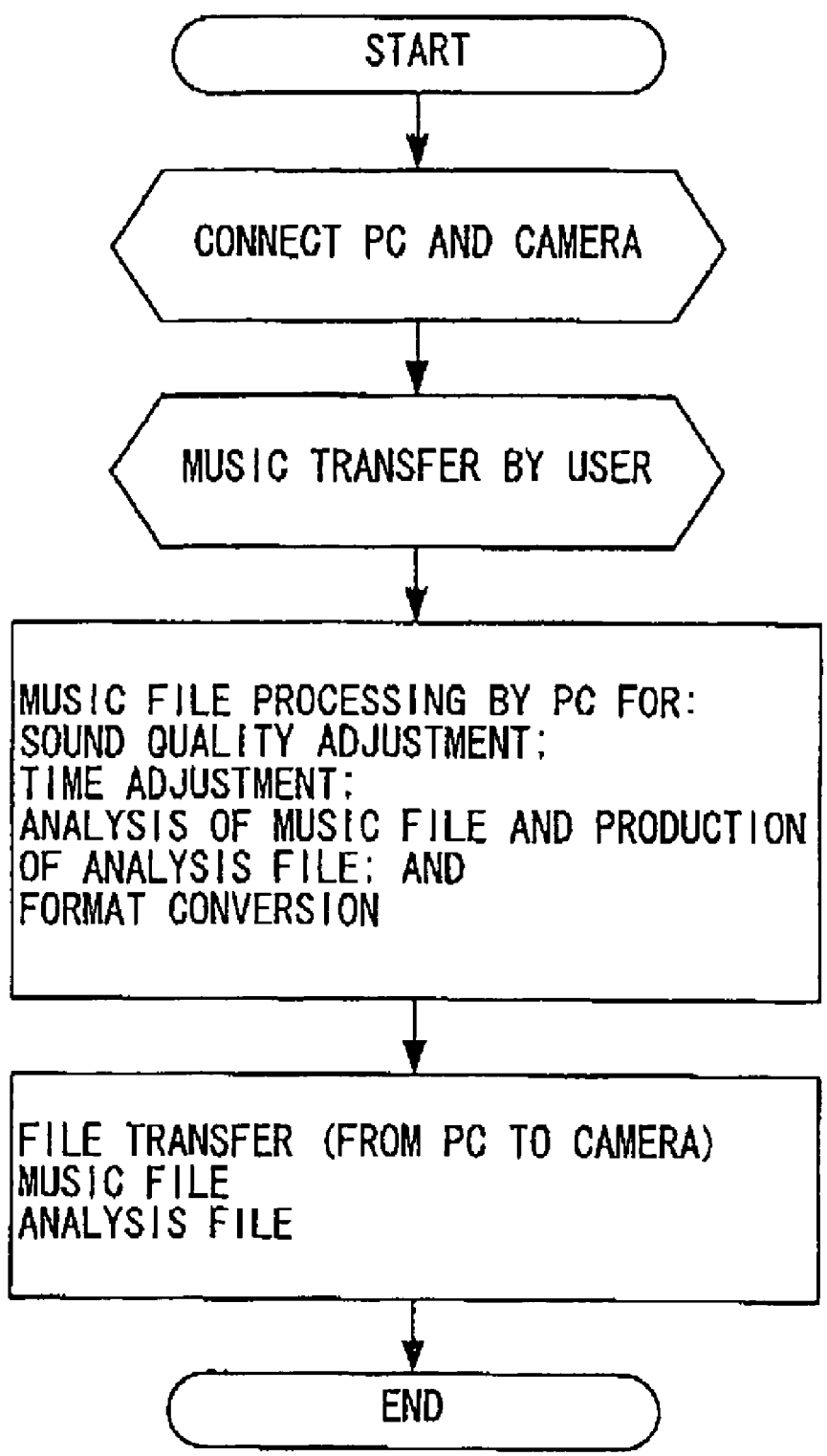
FIG. 4 is a flowchart representing the music processing/transfer program executed by the PC.

FIG. 4 is a flowchart representing the routine for downloading the music. The music is downloaded by installing the music processing/transfer program supplied with the camera 102 in the PC 101, and performing the wired or wireless connection between the camera 102 and the PC 101. When the user operates to start the transfer of the intended music file in the PC 101 selected by the user, the program performs a predetermined conversion with respect to the selected music file prior to the transfer such that the music file suitable for the slide show in the camera 102 is produced.

The conversion process includes the format conversion, the bit rate conversion, the file name change, the playback time adjustment, the sound quality adjustment (equalizing) and the like. The aforementioned process makes the incompatible music file suitable for the use in the camera 102 so as to be played back. The bit rate conversion or the playback time adjustment (reducing the long playback time to short) makes it possible to make the transfer period short by reducing the file size. Furthermore, the sound quality adjustment realizes the tone suitable for the speaker 9 of the camera 102. As the aforementioned process may be executed by the PC 101, the camera 102 is not required to perform the music processing.

The music processing/transfer program creates a music analysis file corresponding to the produced music file for the slide show. The analysis file corresponds with the music file one by one, and contains the information of the corresponding music file. The camera 102 refers to the music analysis file later to set the slide show speed in accordance with the tempo of the music, and the display effect. Upon completion of creation of the file, the music processing/transfer program transfers the music file for slide show and the analysis file to the camera 102. The CPU 1 of the camera 102 stores the transferred files in a predetermined area of the image memory 5. This allows the user to select the music file downloaded from the PC 101 on the menu shown in FIG. 2.

Figure 3:
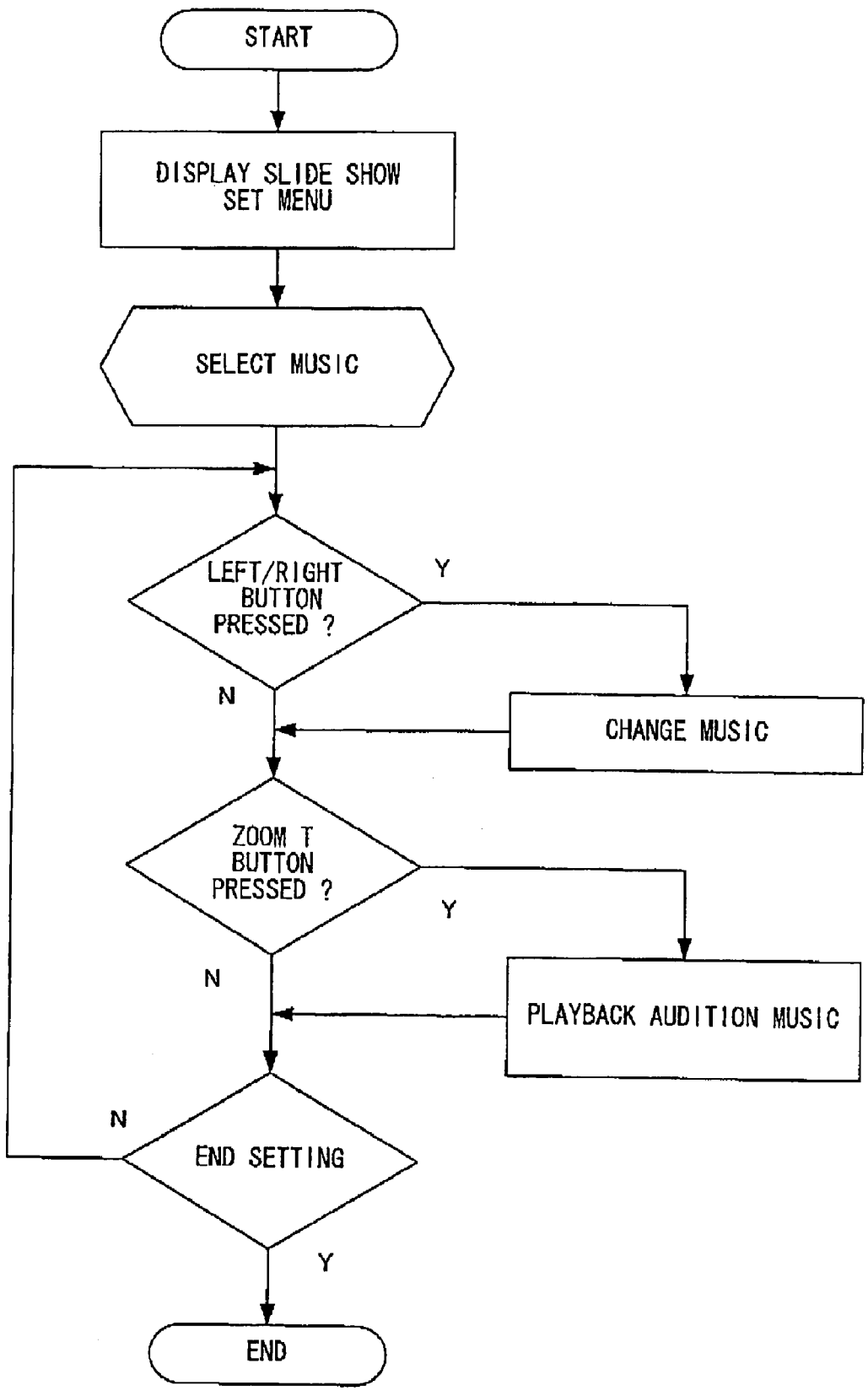
FIG. 3 is a flowchart representing a music selection routine.

When the user performs a specific operation (operation of "TELE" of the zoom button as indicated by FIG. 3) in the state where the music is selected, the selected music file is played back (playback for audition). In this way, the user is capable of using the audition function (test listening) in addition to viewing the title of the tune for selecting the music. This makes it possible to select the music suitable for the user. In this case, the user does not listen to the music file actually used for the slide show but the corresponding music file for audition having the shorter playback time and lower sound quality. The audition music file with the shorter playback time and lower sound quality causes no problem so long as it is for the preview purpose. Actually, the aforementioned audition file makes it possible to perform the audition playback at higher speeds.

(2) Selection of Style

The "style" denotes the effect for switching the image display in the slide show to determine, for example, whether or not such effects as fade in/out, and zoom in/out are executed, whether or not the display is switched while moving the image, whether or not the previous image is superimposed with the subsequent image upon switching and the like. The style is selected from a plurality of options of the second item from the top on the menu shown in FIG. 2 with the four-direction button. By operating the left of the four-direction button, the style is switched to style 1, style 2 and the like, and operating the right of the four-direction button, the style is switched in reverse order. The "style 1" herein is actually displayed as the name of the style.

When the user performs the specific operation (operating TELE of the zoom button) in the state where a certain style is selected, the image is switched according to the selected style on the preview window shown in FIG. 2 (preview display). The moving images that demonstrate the image switching effects according to the respective styles are preliminarily prepared so as to be played back upon the request. Such moving image for the preview purpose may be simply produced to have the shorter playback time. The number of steps for performing the fade out/in for the preview may be smaller than the one used for the actual slide show. This makes it possible to execute the preview processing at higher speeds.

(3) Selection of Playback Order

The playback order selection as the third item is to select the display order between the chronological order of the shooting date and the random order. On the menu shown in FIG. 2, the random playback is selected.

(4) Priority Selection of Music/Image

The priority selection of music/image as the fourth item is to select between the music and the image, based on which the slide show ends. If the "Repeat Music" is selected, the image is prioritized to make sure that all the selected images are displayed. In the case where the music ends before all the images are displayed, the music will be repeatedly played back until all the images are displayed. When all the images are displayed, the slide show will end even in the middle of the music. Meanwhile, if the "Repeat Image" is selected, the music is prioritized to make sure that the slide show stops upon end of the music even if all the images are not displayed. When all the images are displayed in the middle of the music, the images will be repeatedly displayed until the music ends.

(5) Selection of Display Image

The selection of display image is the last item for selecting the image used for the slide show. It is selected from the "automatic selection" and "manual selection". In the "automatic selection" mode, the user sets only the number of images to be displayed. On the menu shown in FIG. 2, "10 images" is selected. By performing the predetermined operation, the item is switched from "10 images", "20 images", . . . to "automatic selection OFF (manual selection) ". Meanwhile, by performing the other operation, it is switched in the reverse order. The slide show is performed by creating the slide show images. In the case where the number of the images for the slide show is too large, the time for creating the slide show images becomes long. For this, the number of the images is limited (for example, to maximum of 30 images) in the automatic selection mode.

Figure 5:
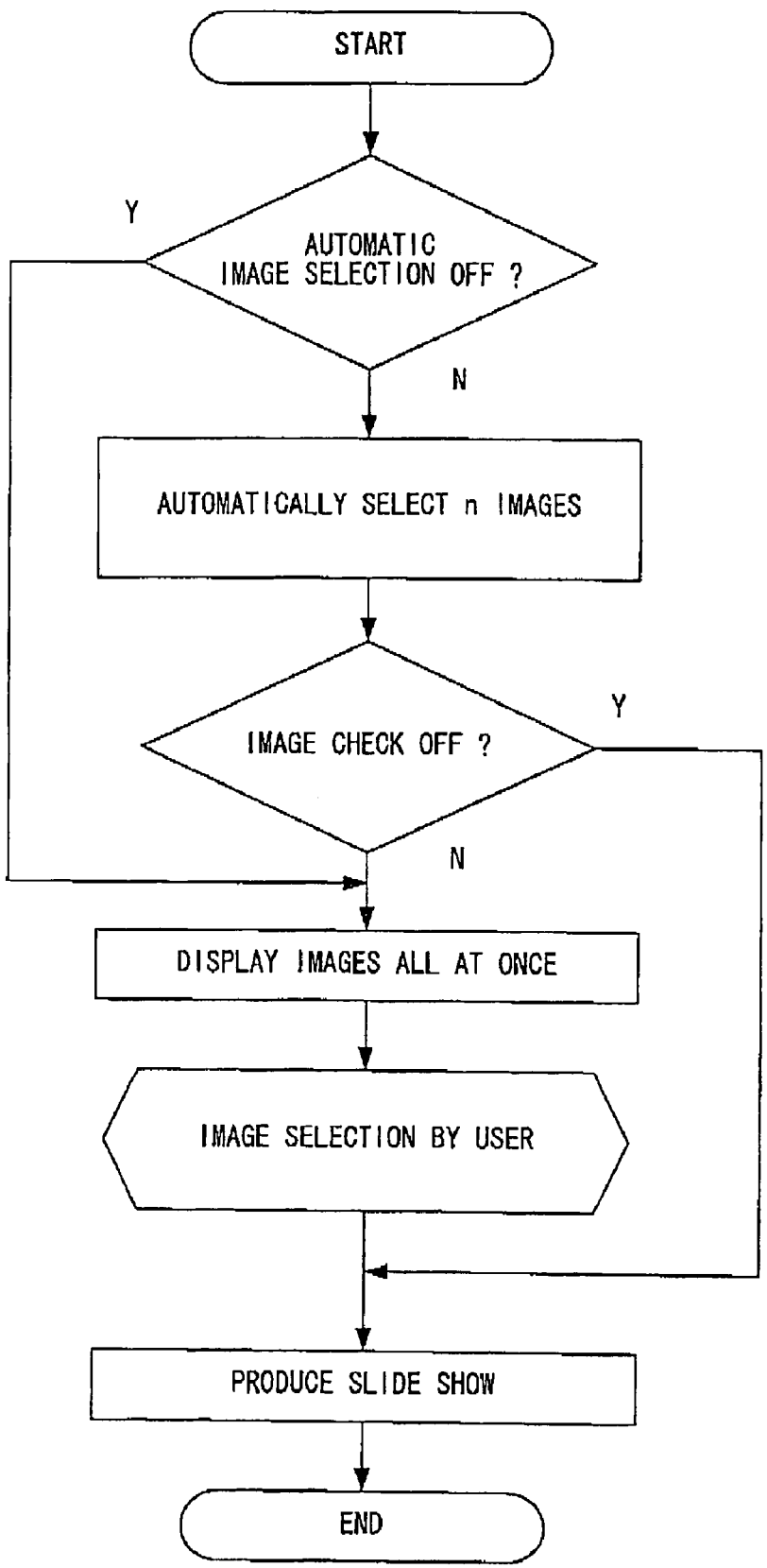
FIG. 5 is a flowchart representing the image selection routine.

The procedure of the operation after selecting the number of images will be described referring to the flowchart of FIG. 5. The CPU 1 of the camera 102 executes a predetermined program stored in the memory 6 to perform the processing of FIG. 3. When the user selects n images in the automatic selection mode, the CPU 1 automatically selects n images from current images. Alternatively, the condition for selecting the image may be prepared so as to be selected by the user. For example, if the specific date is designated as the condition, n images are selected from the latest images on the specific date as the image data for the slide show. The user is allowed to select n images from those data which have not used for the slide show, from the oldest image data, from the image data edited by the camera 102 and the like. Those conditions may be stored in the memory in correlation with keywords so as to be selected by the user to set the condition.

When the "Check Image" is designated in the automatic selection mode, the selected images will be displayed all at once. The user is capable of checking the selected images displayed all at once so as to add, change and delete the image. In the manual selection mode (automatic selection OFF), all the images are displayed at once to allow the user to select the favorite images from the list.

The user is allowed to select the moving image as well as the still image. Generally, the moving image with large data size cannot be directly used for the slide show because of high CPU load which may cause deterioration in the display quality of the slide show. Accordingly, the moving image formats size, frame rate and playback time in accordance with the capacity of the camera 102 may be preliminarily defined for the slide show.

The moving image format, size and frame rate in accordance with the capacity of the camera 102 for the slide show are as follows for example. In case that the file format with which the moving image is stored in the image memory 5 is the MPEG format, the size of the moving image is VGA(640× 480 pixels), and the frame rate of the moving image is 30 fps, the file format, the size and the frame rate are respectively changed to the Motion-JPEG format, QVGA(320×240 pixels) and 15 fps when a moving image file for the slide show is newly generated from the moving image file stored in the image memory 5. Images are compressed and decompressed with the JPEG format in the Motion-JPEG format, and the Motion-JPEG format achieves a moving image by sequentially displaying images compressed and decompressed with the JPEG format.

With the Motion-JPEG format, compression is not performed between frames and this operation is different from the MPEG format that is also a moving image compression format. Although, the compressed rate of the Motion-JPEG format is low, compression and decompression are simple and easy. Consequently, the performance of software and hardware is not required so high compared with the MPEG format. As a result, the Motion-JPEG is a more optimal format for the slide show than the MPEG format. And also, it is preferred that the size of the moving image is set to QVCA and the frame rate is set to 15 fps in consideration of the CPU performance and the buffer memory capacity.

Figure 6:
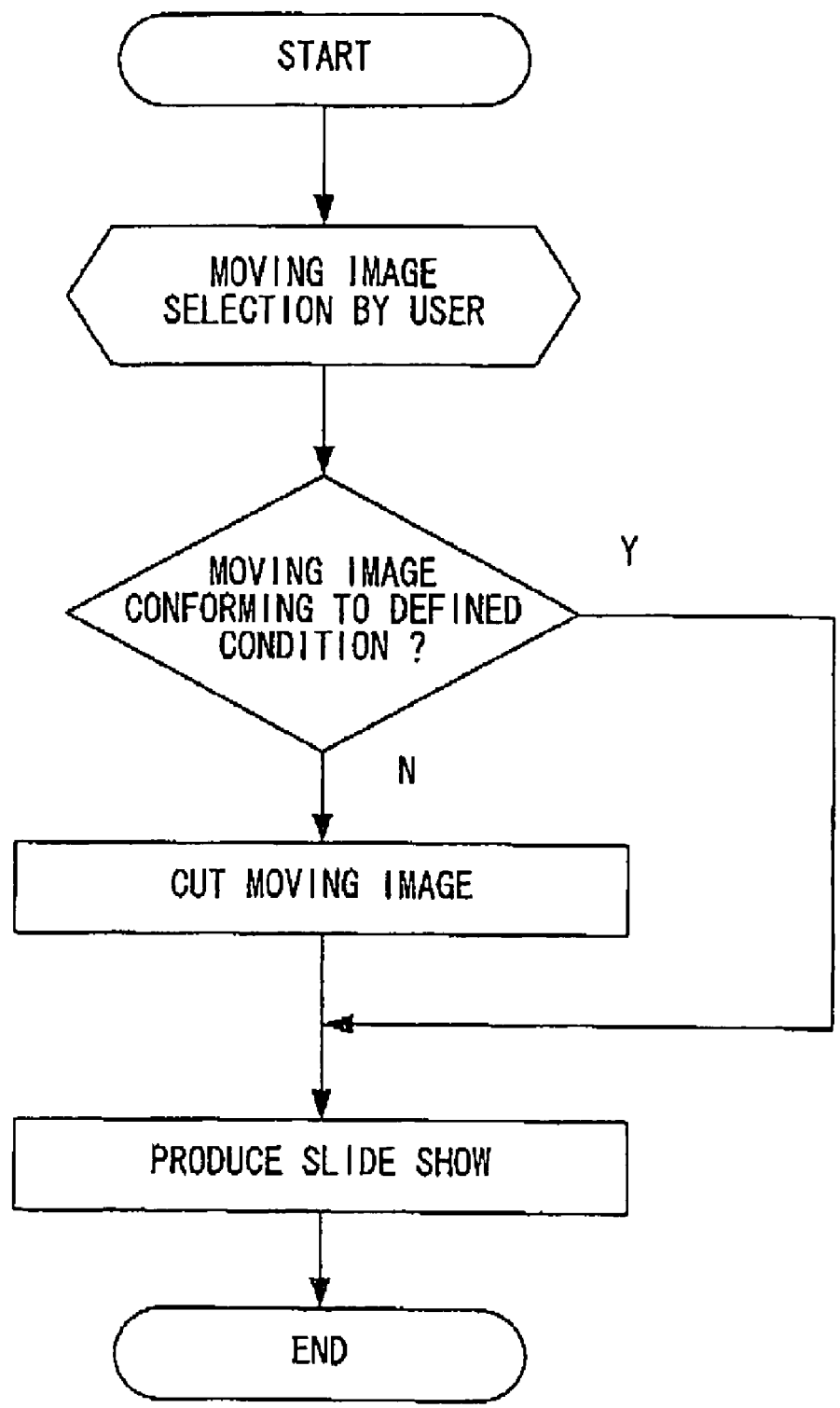
FIG. 6 is a flowchart representing the moving image file processing routine.
Figure 7:
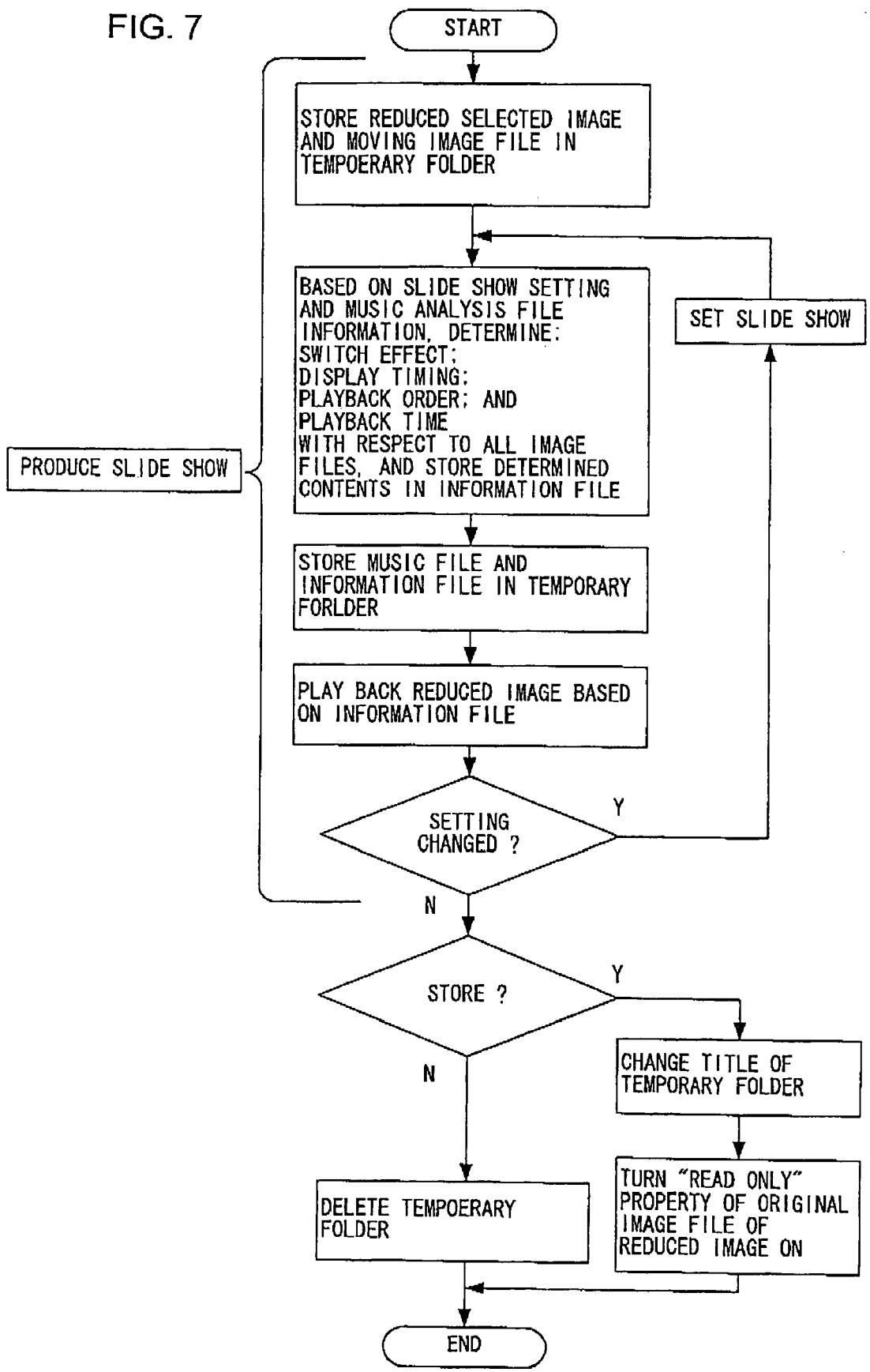
FIG. 7 is a flowchart representing the routine for producing the slide show.

FIG. 6 is a view showing the process for selecting the moving image. The CPU 1 of the camera 102 executes a predetermined program stored in the memory 6 to perform the processing of FIG. 6. When the user selects the moving image file, the CPU 1 determines whether the selected moving image conforms to the defined conditions as described above. If the selected moving image fails to conform to the conditions, the file is processed to create the new moving image file for the slide show conforming to the defined conditions. If the playback time of the original moving image is too long, it is cut to reduce the playback time, for example, for 1 minute. The aforementioned processing allows the moving image to be incorporated to the slide show and smoothly displayed while maintaining sufficient display quality. The "slide show moving image mode" may be preliminarily set prior to the shooting of the moving image for automatically creating the moving image file conforming to the defined conditions while shooting. In this case, the user does not have to process the original moving image as described above, and accordingly, the slide show may be quickly produced.

Based on the aforementioned settings, the slide show is produced. Referring to the flowchart of FIG. 7, more details will be explained. The CPU 1 of the camera 102 executes a predetermined program stored in the memory 6 to perform the processing of FIG. 7. First, the CPU 1 stores the reduced selected image and the moving image file in a temporary folder. The reduced image file is produced for the slide show based on the original image stored in the image memory 5. The use of the reduced image file for the slide show makes the CPU load lower compared with the use of the original image, resulting in smooth image display. As the screen of the display unit 3 is small, the quality of the display will never be deteriorated irrespective of the size reduction. The moving image file selected by the user conforming to the defined conditions may only be stored.

Then the CPU 1 determines the switching effect, display timing, playback order, image playback time with respect to all the image files for the slide show based on the setting of the aforementioned five items and the music analysis file information, and creates the information file that contains the aforementioned data. The created information file is stored in the temporary folder together with the music file to be used.

The CPU 1 sequentially plays back the reduced image files based on the information file. When the user instructs to change the setting, the display returns to the menu shown in FIG. 2 to allow the user to reset. Upon completion of the reset, the information file is newly created based on the set content and stored. When the user instructs OK, the user is asked whether the slide show is stored or not. When the user selects "store", the title of the temporary folder is changed to the set title of the slide show folder. The file property of the original image corresponding to the stored reduced image is made "Read Only". The change in the property makes it possible to discriminate the image file for the slide show from the other image files as well as prevent deletion by mistake. Meanwhile, when the user selects "not store", the temporary folder and all the contained files will be deleted.

The user selects the produced slide show and operates to start the slide show with music.

Each set state of the five items is stored in the memory 6. When the slide show is produced in the next time, the user changes only the necessary item, resulting in the simple and quick operation for providing the slide show.

The following effects may be derived from the embodiment.

Prior to the sequential display, the moving image data format used for the sequential display may be converted into the predetermined format for the sequential display so as to realize smooth sequential display without deteriorating the display quality irrespective of incorporation of the moving image.

The input unit is provided for inputting the number of the images of the image data for the sequential display, that is, n and the conditions for selection so as to extract the maximum of n image data conforming to the input conditions for selection as the image data for the sequential display. This may improve the convenience in selection of the image for the sequential display.

Upon selection of the music used for the sequential display, the user is allowed to listen to the selected music which will be played back with lower sound quality than the original music played back for the actual sequential display, resulting in smooth audio processing.

Upon selection of the display effect for the sequential display, the selected display effect may be previewed on the display in the mode simpler than the one performed for the actual sequential display, resulting in smooth preview processing.

The size of the image file used for the sequential display is made smaller than that of the original file stored in the memory unit. This makes it possible to realize smooth sequential display without deteriorating the display quality.

The music file is processed into the format conforming to the playback in the image playback apparatus by the transfer unit when the music file is transferred to the image playback apparatus. This makes it possible to minimize the size of the music file to be transferred without the need of adding the unit for processing the music file to the image playback apparatus.

The aforementioned embodiment shows the example for performing the slide show by the camera 102. The present invention is applicable to the device other than the camera so long as it is capable of playing back both the image and music. The PC 101 is allowed to execute the program that is executed by the camera 102 as described in the embodiment to perform the slide show, for example. Such program may be supplied as the computer program products readable by the computer in various forms, for example, the recording medium, carrier wave and the like. It may be applied to the portable telephone (the cell phone), PDA and the like.

The above described embodiments are examples, and various modifications can be made without departing from the spirit and scope of the invention.

What is claimed is:

1. An image playback method that performs a slide show of a sequential display of a plurality of image data including a moving image stored in a memory unit while each being switched at predetermined time intervals, the plurality of image data being capable of including a moving image data and a still image data, the method comprising:
    judging whether the moving image data for the slide show conforms to a predetermined condition for the slide show prior to the slide show;
    processing the moving image data to create a new moving image data to conform to the predetermined condition for the slide show, when the moving image data is judged to fail to conform to the predetermined condition; and
    performing the slide show by using the created new moving image data.

2. An image playback method according to claim, further comprising:
    inputting a number n of images of the plurality of image data for the slide show and a selection condition; and
    extracting the n image data as a maximum value that satisfy the input selection condition as the image data used for the slide show.

3. An image playback method according to claim 1, further comprising:
    playing back music during the slide show; and
    selecting the music, wherein:
    upon selection of the music, the music is made audible for audition and is played back with lower sound quality than the music to be played back in an actual slide show.

4. An image playback method according to claim 1, further comprising:
selecting a display effect for the slide show, wherein:
upon selection of the display effect, the display effect is allowed to be previewed on a display simpler than an actually performed slide show.

5. An image playback method according to claim 1, further comprising:
using a reduced image for the slide show with a size of the reduced image smaller than an original image file stored in the memory unit, as the image file for the slide show.

6. An image playback method according to claim 5, further comprising
adding a read only property to the original image file corresponding to the reduced image file for the slide show.

7. An image playback method according to claim 1, further comprising:
processing a music file into a format suitable for a playback performed by an image playback apparatus; and
transferring the processed music file to the image playback apparatus.

8. An image playback method according to claim 1, further comprising:
producing an analysis file that defines a display mode for the slide show of a music file; and
transferring the music file and the analysis file to an image playback apparatus.

9. An image playback apparatus, comprising:
a control unit that executes the image playback method according to claim 1.

10. An image playback apparatus, comprising:
a control unit that executes the image playback method according to claim 2.

11. An image playback apparatus, comprising:
a control unit that executes the image playback method according to claim 3.

12. An image playback apparatus, comprising:
a control unit that executes the image playback method according to claim 4.

13. An image playback apparatus, comprising:
a control unit that executes the image playback method according to claim 5.

14. A computer-readable computer program product comprising:
an image playback program that allows a computer to execute the image playback method according to claim 1.

15. A computer-readable computer program product comprising:
an image playback program that allows a computer to execute the image playback method according to claim 2.

16. A computer-readable computer program product comprising:
an image playback program that allows a computer to execute the image playback method according to claim 3.

17. A computer-readable computer program product comprising:
an image playback program that allows a computer to execute the image playback method according to claim 4.

18. A computer-readable computer program product comprising:
an image playback program that allows a computer to execute the image playback method according to claim 5.

19. A computer-readable computer program product comprising:
a music processing program that allows a computer to execute the image playback method according to claim 7.

20. A computer-readable computer program product comprising:
a music processing program that allows a computer to execute the image playback method according to claim 8.

21. An image playback method according to claim 1, wherein
the predetermined condition for the slide show relates to at least one of a file format, an image size, a frame rate and a playback time of the moving image data for the slide show.

22. An image playback method according to claim 1, wherein
the predetermined condition for the slide show includes a predetermined playback time of the moving image data for the slide show;
the judging includes judging whether a playback time of the moving image data for the slide show is longer than the predetermined playback time; and
the processing includes processing the moving image data to create the new moving image data so that a playback time of the created new moving image data for the slide show becomes shorter than the predetermined playback time, when the playback time of the moving mage data for the slide show is judged to be longer than the predetermined playback time.

* * * * *